United States Patent
Cheung et al.

(10) Patent No.: US 6,919,724 B2
(45) Date of Patent: Jul. 19, 2005

(54) METHOD AND APPARATUS FOR INVESTIGATING THE WALL OF A BOREHOLE

(75) Inventors: Philip Cheung, Montesson (FR); Andrew Hayman, Voisins-le-Bretonneux (FR); Dennis Pittman, rue Claude Monet (FR); Abdurrahman Sezginer, Los Gatos, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 66 days.

(21) Appl. No.: 10/240,646
(22) PCT Filed: Mar. 29, 2001
(86) PCT No.: PCT/EP01/03717
§ 371 (c)(1), (2), (4) Date: Feb. 24, 2003
(87) PCT Pub. No.: WO01/77710
PCT Pub. Date: Oct. 18, 2001

(65) Prior Publication Data
US 2003/0173968 A1 Sep. 18, 2003

(51) Int. Cl.$^7$ .............................................. G01V 3/18
(52) U.S. Cl. ...................................... 324/366; 324/347
(58) Field of Search ........................ 324/347, 354–357, 324/363–370

(56) References Cited
U.S. PATENT DOCUMENTS

| | | |
|---|---|---|
| 4,514,809 A | 4/1985 | Johnson, Jr. et al. |
| 4,714,889 A | 12/1987 | Chapman et al. |
| 4,738,812 A | 4/1988 | Raynal |
| 5,036,283 A | 7/1991 | Trouiller et al. |
| 6,191,588 B1 | 2/2001 | Chen |

Primary Examiner—Bot LeDynh
(74) Attorney, Agent, or Firm—Victor H. Segura; Brigitte L. Echols

(57) ABSTRACT

The present invention relates to a method of investigating the wall (2) of a borehole in a geological formation by means of two injectors (4, 5) with a potential V being applied between them and in measuring the potential difference $\delta V$ between two electrically isolated measurement electrodes (6) situated between the two injectors (4, 5) and spaced apart from the formation by an insulating layer (1), in which the resistivity of the formation is obtained from the measured values of $\delta V$, V and I, with corrections being made for the effects due to the nature and the thickness of the insulating layer (1). In a first variant these corrections are based on a correction factor obtained from curves of $K=Rt.I/\delta V$ as a function of the impedance V/I of the injector. In a second variant these corrections are obtained by estimating the current $I_F$ actually injected into the formation while taking account of leakage current $I_L$, and calculating the resistivity of the formation from the equation (I). The invention also provides an investigation device enabling the values of $I_F$ and/or $I_L$ to be estimated.

$$Rt = k_c \frac{\delta V}{I_F} = k_c \frac{\delta V}{I - I_L} \quad (I)$$

12 Claims, 6 Drawing Sheets

METHOD AND APPARATUS FOR INVESTIGATING THE WALL OF A BOREHOLE

The present invention relates to in general to electrically scanning a borehole passing through a terrestrial formation, and more particularly to a logging sonde enabling images to be made of data acquired by high resolution investigation of the wall of a borehole.

In general, in order to explore hydrocarbon deposits, an accurate knowledge of the characteristics of the geological formation at various depths of the borehole is highly desirable. Many of these characteristics are very fine in structure, for example stratifications, detecting non-homogenous elements, and the characteristics of pores, breaks, etc. The orientation, the density, and the length of breaks all play a major role in the dynamic characteristics of a reservoir rock, for example.

For many years, such fine characteristics could only be determined by analyzing cores taken at the time the borehole was drilled. Nevertheless, taking cores is a technique that is extremely expensive and its use remains relatively exceptional.

Patent EP-0 110 750, or corresponding U.S. Pat. No. 4,567,759, describes a technique for producing an image of the wall of a borehole which consists in generating signals at regular time intervals, which signals represent a measurement at high spatial resolution of some characteristic of the wall, in measuring the depth of the hole to which the characteristic signals relate with accuracy of the same order as the spatial resolution of the characteristic signals, and in converting the signals representing the characteristic as a linear function of borehole depth, with a color scale being associated with the values of the converted signals so as to form a visual image.

That imaging technique is particularly implemented using a tool for investigating formation conductivity of the kind described, for example, in patent EP-0 071 540 or corresponding U.S. Pat. No. 4,468,623 which is capable of detecting characteristics with millimeter resolution. That type of tool has a series of control electrodes, also referred to as "buttons", placed on a conductive pad pressed against the wall of the borehole. A constant current source applies voltage to each button and to the conductive surface of the pad so that measurement currents are injected into the formation, perpendicularly to the wall. A return is provided for the current via an electrode situated close to the surface, or possibly on some other portion of the tool. The pad is moved along the borehole and the discrete current coming from each button is proportional to the conductivity of the material facing that button.

In application of the teaching of patent U.S. Pat. No. 4,567,759, the signals are modified to eliminate effects such as variations in tool speed and disturbances due to variations in the environment of the tool, and they are then amplified and displayed in a manner which approximates to a visual image of the inside of the hole.

That imaging technique has been highly successful over the last few years, being used in boreholes drilled with conductive drilling mud such as a water-base mud or an oil-in-water emulsion type mud. With muds in which the continuous phase is non-conductive, such as oil-base muds or water-in-oil emulsion type muds, the images obtained are of very poor quality and are usually deemed to be unusable. Such poor results are generally attributed to interference due to the presence of a layer of non-conductive mud, or to a layer of mud and of mud cake, interposed between the buttons and the formation under test. Since the thickness of the mud cake varies in particular as a function of roughness of the wall, the resulting current variations can completely mask current variations due to the measured formation.

A new technique of imaging a borehole drilled with a non-conductive drilling mud is described in international patent application PCT/US99/14420. That tool for investigating formation conductivity differs from the tool known from patent U.S. Pat. No. 4,468,623 in that it uses a non-conductive pad and buttons that constitute voltage electrodes and not current electrodes. The current injection electrodes are situated off the pad, or in a preferred variant, directly at the ends thereof. In any event, both injectors are placed in such a manner that the current passes through the formation substantially parallel to the pad, and is thus preferably substantially orthogonal to the boundaries between strata. Under such conditions, the potential difference between two buttons is proportional to the resistivity of the material facing the buttons.

Nevertheless, measuring potential difference cannot be considered as providing a quantitative measurement of the resistivity of the material, even when the formation is homogenous. The pad is insulated from the formation by a layer of mud and possibly also of mud cake. The resistance, or where appropriate the impedance, of said insulating layer depends on the nature of the mud and on the thickness of said insulating layer, or in other words on the distance between the rock formation and the pad.

Very many oils are available on the market for drilling muds; in addition, oil-base drilling muds are usually water-in-oil emulsions in which the water content can vary very widely, with some muds being constituted almost entirely with oil, while others have a water fraction constituting more than 50% by volume. Furthermore, the thickness of the insulating layer is not known accurately and above all it is not the same for all button pairs if the pad should slope, if it is not exactly parallel to the wall.

Under such conditions, the wall resistivity values calculated on the basis of measuring potential difference between two buttons are erroneous, with uncertainty of the order of ±30%. It should be emphasized that this does not mean that the tool is incapable of producing images that are representative of the wall, since neither the nature of the mud nor the thickness of the insulating layer vary at the millimeter scale of image resolution. Nevertheless, it would be desirable to be able to correct this error in such a manner as to obtain a quantitative measurement of the resistivity of the formation.

In a first aspect, the invention provides a method of investigating the wall of a borehole in a geological formation, the method comprising injecting a current I into the formation via two injectors between which a potential V is applied, and measuring the potential difference $\delta V$ between two electrically isolated measurement electrodes situated between the two injectors and insulated from the formation by an insulating layer, wherein the resistivity Rt of the formation is obtained using the measured values of $\delta V$, V, and I, with corrections for effects due to the nature and the thickness of the insulating layer. When drilling with an oil-base mud, this insulating layer is constituted by the thickness of the layer of mud deposited along the wall of the borehole.

In a first implementation of the invention, this correction of resistivity measurement is performed on the basis of a correction factor obtained from curves of:

$$k = Rt.I/dV$$

as a function of the impedance of the injector V/I, by applying the following formula:

$$R_t = k_0(Z_I) \cdot dV/I$$

in which $k_0$ is a geometrical factor depending on the impedance $Z_I = V/I$.

Advantageously, this equation does not depend on the distance between the measurement electrodes and the formation. The value of the geometrical factor k may be determined by modelling or by experiment, by measuring the values of δV, V, and I while varying the resistivity of the formation, the distance between the injectors and the wall, and the resistivity of the insulating layer.

In a second approach of the invention, this correction is obtained by determining the current $I_F$ that is actually injected into the formation, in other words by evaluating the leakage currents $I_L$, and then calculating the resistivity using the following formula:

$$Rt = k_c \frac{\delta V}{I_F} = k_c \frac{\delta V}{I - I_L}$$

where $k_c$ is a geometrical constant that can be determined by modelization or by experiment.

In another aspect, the invention also provides a variant of the device known from international patent application PCT/US99/14420 enabling these leakage currents to be measured, and essentially characterized by the current injectors being isolated by means of electrically conductive screens forming a cage surrounding all of the faces of the injector with the exception of its face in contact with the drilling mud and the formation, and in measuring the current injected into the formation by using measurement means placed between the injector and the screen.

Other details and advantageous characteristics of the invention appear from the following description made with reference to the accompanying drawings, in which.

Figure 1:
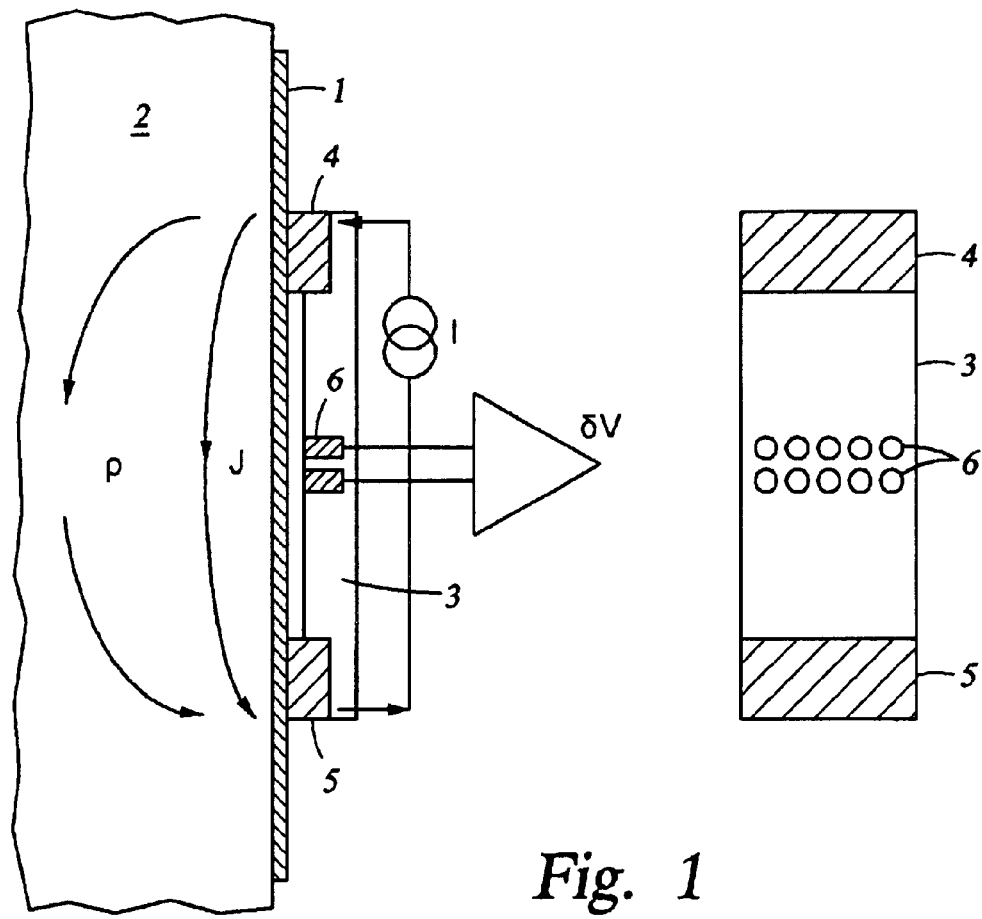
FIG. 1 is a diagram showing how microelectrical measurements are made of the formation.

FIG. 1 is a diagram showing the principle of electrical measurements performed in the imaging technique of international patent application PCT/US99/14420. That tool is particularly adapted to investigating the wall 2 of a borehole drilled with a non-conductive drilling mud such as, for example, a drilling fluid whose liquid phase is essentially an oil (diesel, synthetic oil) or an emulsion of water in oil. The term "water-base muds" is used herein as a common term for both of these types of drilling fluid. The drilling mud forms a mud cake 1 along the wall 2.

The tool for investigating the wall of a borehole comprises a pad 3 made of an electrically insulating material such as a ceramic or polymers having high mechanical strength and high thermal and chemical stability, and in particular of the polyarylene ether ketone type (polyether ether ketone or PEEK).

In the variant shown here, the pad serves as a support for two current injectors: a source electrode 4 and a return electrode 5. These two electrodes are situated at opposite ends of the pad and they occupy the entire width thereof as can be seen more clearly in the front view of the pad, or at least a large portion of the width thereof so as to maximize the area of these current injection electrodes. The central portion of the pad has two rows of measurement electrodes 6, giving five pairs of measurement electrodes in the example shown. The shape of the pad is such that the measurement electrodes 6 are set back slightly so that the measurement electrodes are not directly in contact with the geological formation when the pad is pressed against the wall 2. Nevertheless, the distance between the measurement electrodes and the formation is not defined: for example the pad might not be exactly parallel to the wall, and with porous rocks a mud cake is formed during drilling with an oil-base mud that presents higher resistivity than the geological formation, which mud cake is always interposed between the measurement electrodes and the geological formation.

With DC, or AC at low frequency (less than about 100 kHz), the resistivity of the geological formations generally lies in the range 0.1 ohm.m to 10000 ohm.m whereas an oil-base mud presents effective resistivity of the order of 0.1 Mohm.m to 10 Mohm.m. Under such conditions, when a current I is injected into the formation by the injectors 4 and 5, with the measurement electrodes being insulated by the non-conductive pad, it is observed in application Ohm's law that the resistivity ρ of the formation situated beneath a pair of measurement electrodes is equal to the ratio of the potential difference δV between the two electrodes and the current density J. In other words, the resistivity Rt of the formation is obtained from the equation Rt=δV/J=k.δV/I where k is a geometrical factor.

If the injected current is AC at a frequency greater than about 1 kHz, the pad can no longer be considered as being a perfect electrical insulator, and on the contrary it must be considered as being a dielectric immersed in a dielectric medium, i.e. the oil-base mud. Nevertheless, if the measurement electrode zone is shielded and this shielding is connected to the potential of the formation as in the preferred embodiment described in the patent application filed on this day in the names of the inventors of the present application, then this apparent proportionality is still to be found between the potential between the measurement electrodes and the resistivity of the formation, i.e. once more Rt=δV/J=k.δV/I.

Figure 2:
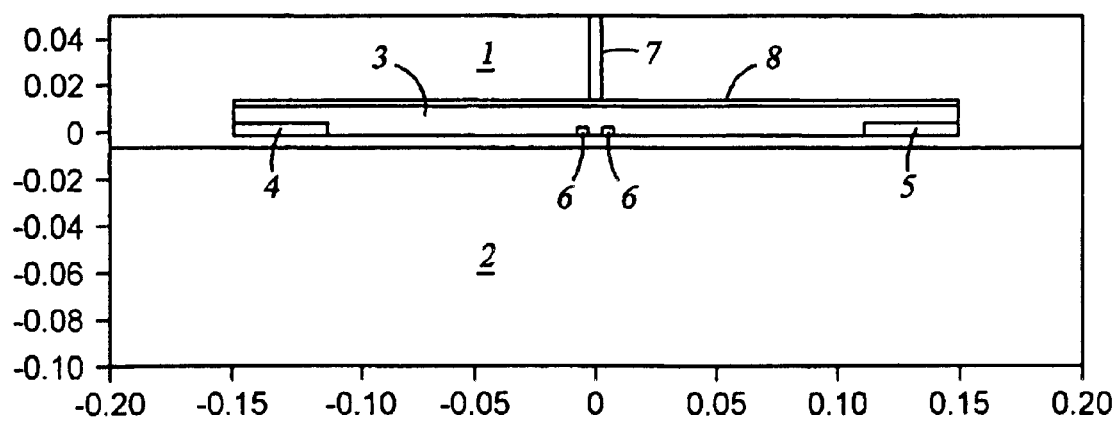
FIG. 2 shows the geometrical model used for simulating electric fields in the geological formation.

To examine in detail the influence of the distance between the pad and the formation, the pad in contact with the formation has been modelled. The model used is shown in FIG. 2. It consists in a thickness of mud 1 equal to 5 mm deposited on a rock 2 that is 1 meter (m) thick and 2 m long. The pad placed in the central portion of the model is modelled in the form of a rectangular body 3 that is 300 mm long and 12.5 mm thick, with current injectors 4 and 5 that are 40 mm long and 5 mm thick, and a pair of measurement electrodes 6, each of which is 5 mm long and 2.5 mm thick. The pad is connected to the remainder of the tool via a metal arm 7. This model ignores in particular the bundle of electric wires connecting the pad to the signal processing electronics unit. In addition, it assumes that the Faraday cage which isolates the electronics unit acts as a perfect screen and does not interfere in the currents. The pad is also provided with a conductive metal backplate 8 at a potential that is identical to that of the rock (it is grounded).

The oil-base mud in question is an emulsion of water in oil, in a ratio of 10:90 or 30:70, and the oil is a synthetic oil of the n-olefin type.

Figure 3A:
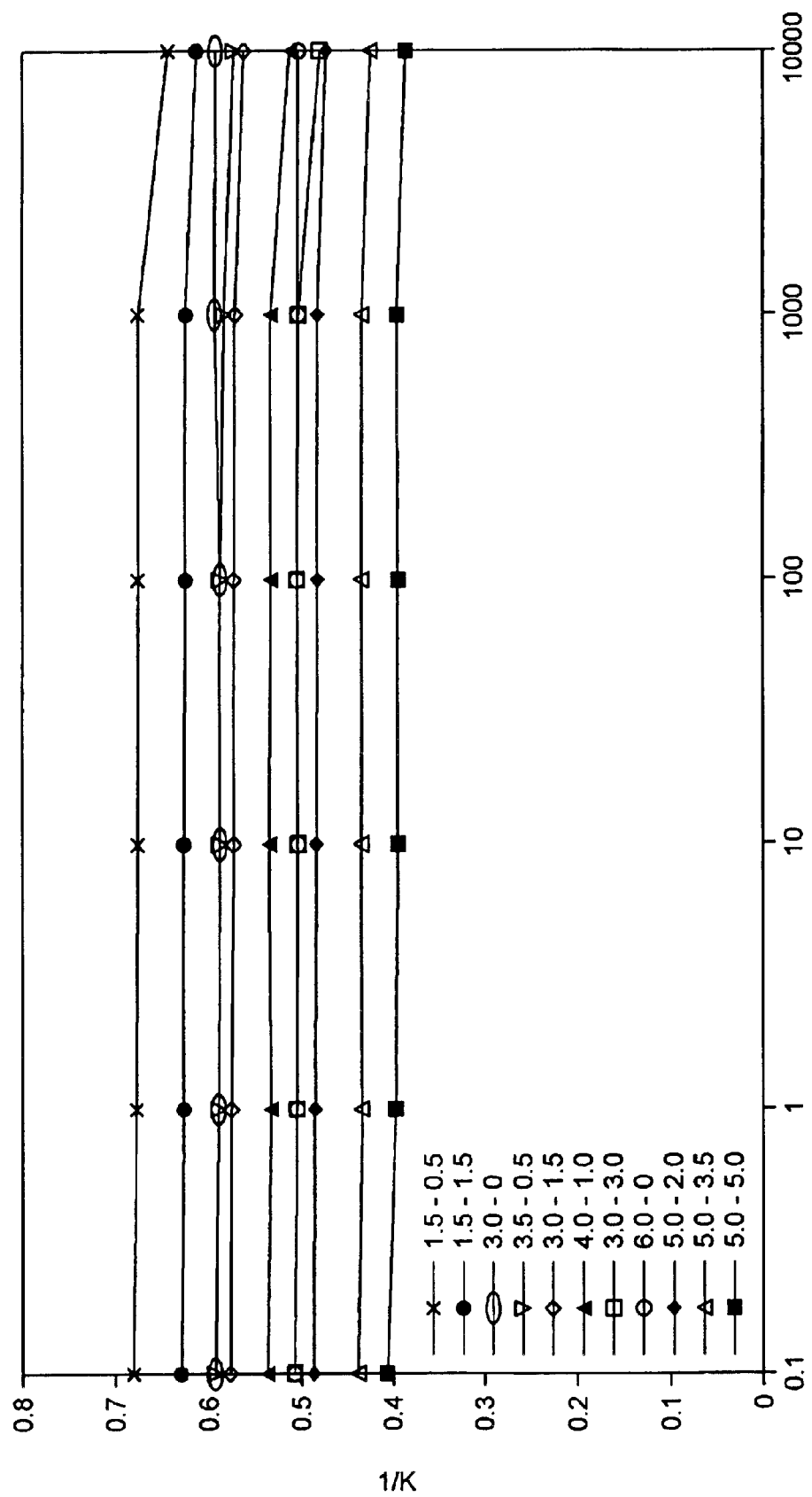
FIGS. 3A and 3B are graphs computed on the basis of the model of FIG. 2 and showing the value of the coefficient 1/k as a function of rock resistivity for two different types of drilling mud and different inclinations and spacings of the pad.
Figure 3B:
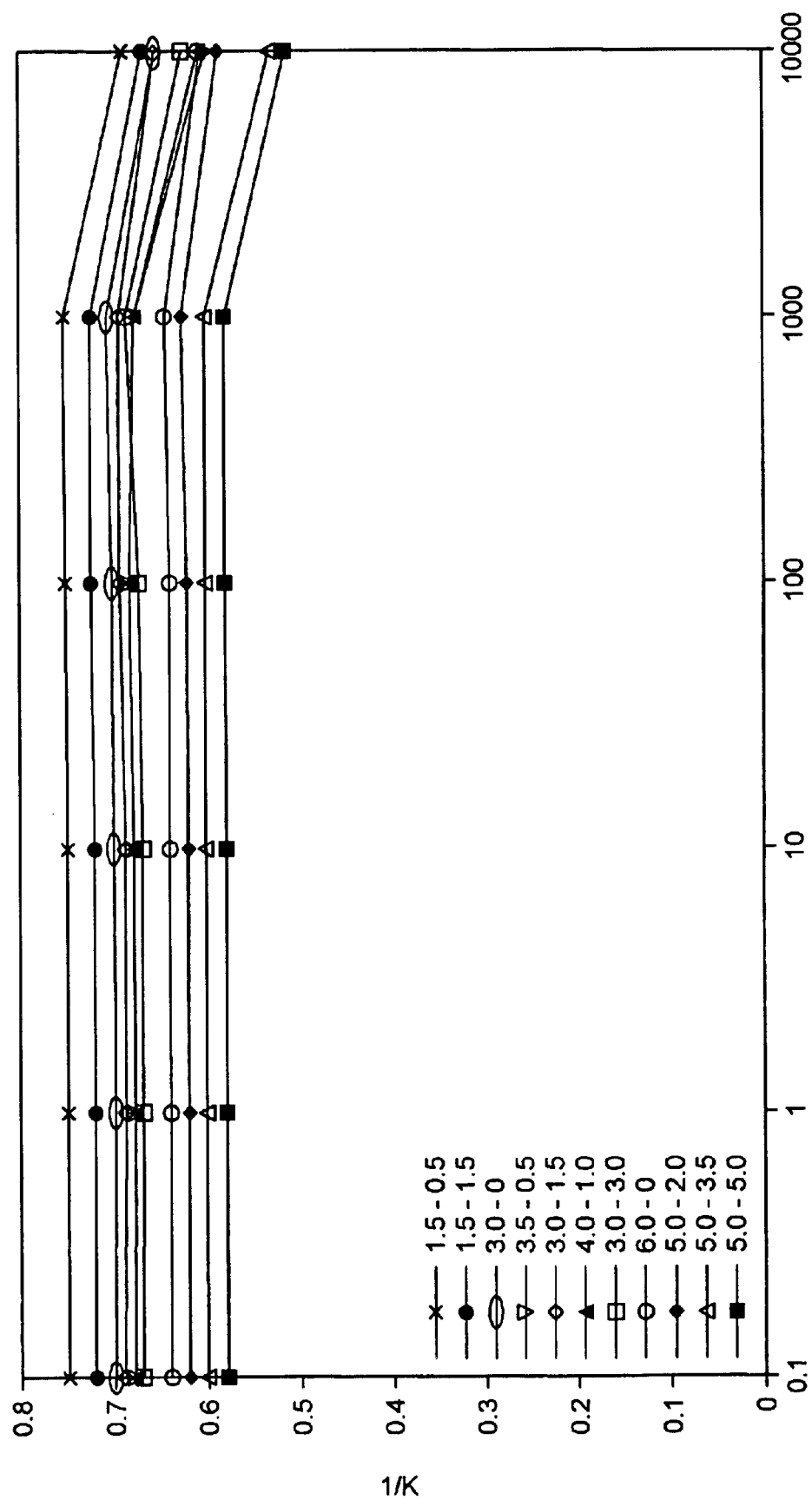

A series of models have been made with six different types of rock, of resistivities lying in the range 0.1 kohm.m to 10 kohm.m, and with various different pad positions, by varying the distance between the formation and the injectors, and by varying the slope of the pad. FIGS. 3A and 3B are graphs in which the calculated values of the quotient 1/k are plotted as a function of the value of Rt using the following equation:

$$1/k = \delta V/J = \delta V/I.1/Rt = \delta V^*/Rt$$

where δV* is equal to the normalized value δV/I for a first oil-base mud having low water content (ratio 10:90, FIG. 3A) and for a second mud having 30% water content (FIG. 3B).

The reciprocal is used to show up the differences which act on the fifth decimal place or higher.

In FIGS. 3A and 3B, the legend gives the distance between the formation and the two injectors, thus, the method 1.5–0.5 means that the pad is sloping and has one of its injectors 1.5 mm away from the formation and its other injector 0.5 mm away therefrom. In FIG. 3A, the plots go downwards in the order in which the legends are presented: the highest values of 1/k thus correspond to the pad being at a small spacing or "standoff". The same applies to FIG. 3B with the exception of plot 6-0 which is interposed between the plots 5-2 and 5-3.5.

For given mud and spacing, 1/k is constant providing the resistivity of the rock is less than 1000 ohm.m. For given mud, 1/k decreases if the total standoff defined as the sum of the distances to the injectors decreases, and in contrast the effect of asymmetry is quite small. A more conductive mud conducts at higher values of 1/k.

In general, the values of 1/k obtained by this simulation vary over ±30%, which does not harm image quality but which makes it impossible to obtain a quantitative measure of the resistance of the formation.

Figure 4:
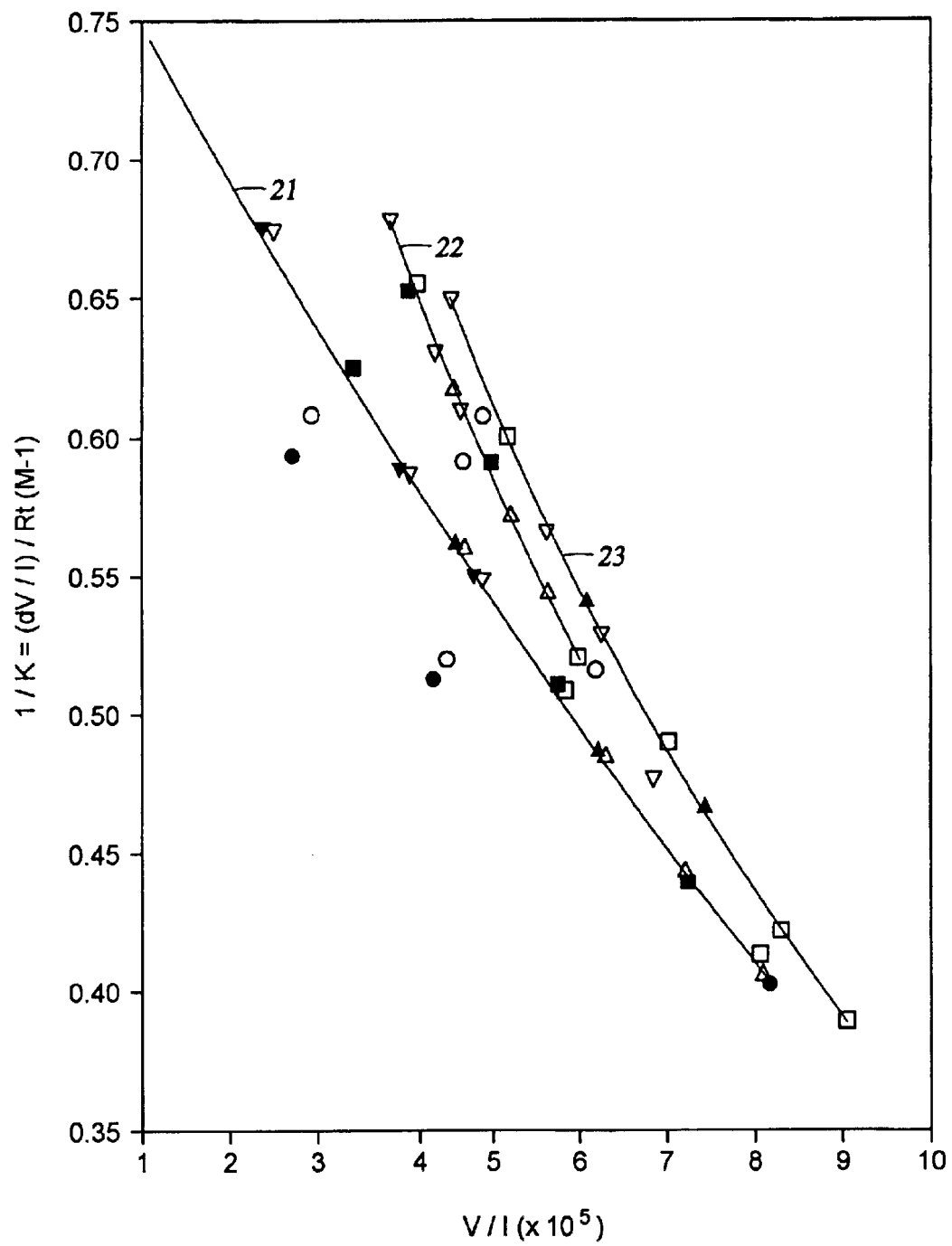
FIG. 4 is a graph plotting 1/k as a function of the impedance value V/I.

FIG. 4 is a graph in which the values for 1/k are not calculated as a function of formation resistivity, but as a function of the impedance of the injector $Z_I$=V/I. By ignoring all of the points represented by circles which correspond to direct contact between the formation and the pad, as stated in the legend of FIG. 3, it can be seen that all of the calculated values of 1/k for a rock formation having resistivity of less than 1000 ohm.m lie within ±2% of the least squares fit curve referenced 21 and plotted using a continuous line, regardless of the resistivity of the mud (the pale points situated essentially to the left of the figure correspond to an emulsion of the 30:70 type while the dark points correspond to an emulsion of the 10:90 type, i.e. an emulsion of lower conductivity). In contrast, when the resistivity of the rock is assumed to be equal to 10000 ohm.m, the values lie on two distinct least squares fit curves 22 and 23 depending on the nature of the mud (curve 22 corresponding to mud having 30% water and curve 23 corresponding to mud having only 10% water). At such high resistivities, it is therefore no longer possible to ignore the kind of mud.

The curves of FIG. 4 can also be considered as reference curves so it suffices to measure the impedance of the injector in order to discover the value of 1/k and then calculate the resistivity of the formation as a function of the potential measured by the measurement electrodes.

When performing a real measurement where, by definition, neither the resistivity of the formation nor the resistivity of the drilling mud are known, successive approximations are used assuming that the resistivity of the formation is less than 1000 ohm.m in order to obtain a first estimated value $k_0$ for k, and then to calculate a first value for R using the equation:

$$R = k_0(Z_I) \cdot \frac{dV}{I}$$

If this calculation gives the value of less 1000 ohm.m, then this value is assumed to be equal to Rt.

If this calculation gives the value greater than 1000 ohm.m, a new value $k_r$ is estimated using the equation:

$$\frac{1}{k_r} = \frac{1}{k_0(Z_I)} + \frac{R-1000}{10000-1000} \cdot \left[\frac{1}{k_a(Z_I)} - \frac{1}{k_0(Z_I)}\right]$$

where $k_a$ is the value of 1/k obtained for a resistivity of 10000 ohm.m for a mud of "average" resistivity. This value of $k_r$ is then used for calculating a new value for Rt. In this case, the margin of error is about 4% (the value being overestimated for muds that are highly resistive and underestimated for muds that are more conductive), but it should be observed that in any event, high accuracy is rarely sought for rocks of such low conductivity.

A simpler approach is to observe that calculation based on a value of k calculated on the assumption that the resistivity of the formation is less than 1000 ohm.m always leads to the value of Rt being overestimated, with the amount of overestimation increasing with increasing value of Rt. This error can thus be corrected merely by interpolation in application of the following equation:

$$R_c = R \cdot \left[1 - 0.09 \cdot \frac{R-1000}{10000-1000}\right]$$

In the case shown herein, the graph showing 1/k as a function of injector impedance was obtained by modelling the pad and the tool. In practice, a real tool is often too complex to be modelled correctly, so the graph is preferably obtained in absolute manner on the basis of real measurements compared with those obtained with other logging tools. This calibration of the tool can be greatly simplified if it is observed that the plot gives a curve that is practically a straight line.

The approach for correcting measurements as explained above is relatively empirical. Even though this empirical nature does not mean it is ineffective, it might be much more preferable to proceed with a simplified approach that is more direct.

In this new approach, it is assumed that the current $I_F$ injected into the formation between the two injectors is only a fraction of the current I that is delivered by the current source used. In practice, a certain number of electricity "leaks" arise, as shown in FIG. 5.

Figure 5:
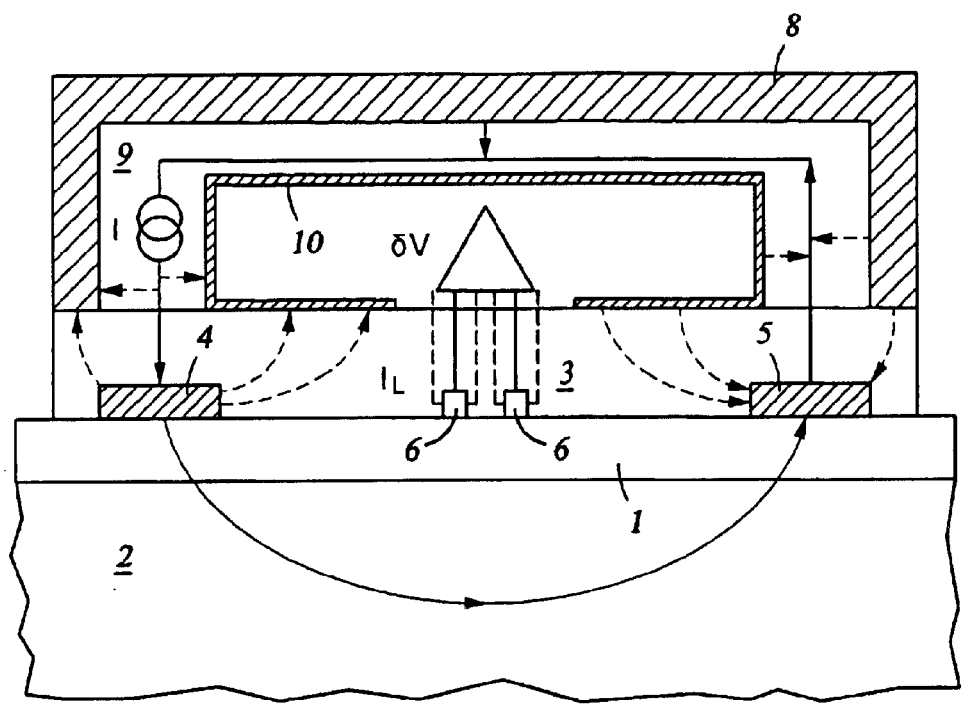
FIG. 5 is a diagram showing the main "leaks" through the pad.

FIG. 5 shows the insulating pad 3 on which the current injectors 4 and 5 are mounted together with the measurement buttons 6. The pad is fixed to a metal structure 8 which defines a cavity 9 at the back of the insulating pad 3. Current and voltage detector means are housed in the cavity 9 together with all of the electronics which is electrically isolated by metal shielding 10.

As mentioned above, a current I is injected into the formation by the injectors and the potential difference δV between pairs of measurement electrodes is proportional to the product of the resistivity ρ of the formation facing the measurement electrodes and the current $I_F$ actually flowing through the formation, with the weighting factor being a geometrical factor $k_c$, in other words Rt=$k_c$δV/$I_F$.

The current I delivered by the current source is the sum of the current $I_F$ injected into the formation plus the leakage currents $I_L$. The leakage current $I_L$ is due essentially to capacitive coupling between the injectors, to the electric cables and connections, and to the metal structures. The impedance $Z_L$ seen by the leakage current $I_L$ consists essentially in a combination of two impedances connected in parallel: an impedance $Z_P$ due to the pad and an impedance $Z_M$ due to the mud. Since the drilling mud is highly resistive, the value 1/$Z_M$ can be considered to a first approximation as being constant regardless of the thickness and the nature of the mud, such that the impedance $Z_L$ is not affected by any variant in the thickness or the nature of the mud.

However, the impedance $Z_F$ as seen by the current $I_F$ consists in two impedances connected in series: one impedance due to the standoffs of the pad, and another impedance due to the resistivity of the rock. If the rock is of low conductivity, its resistivity can be of an order of magnitude that is comparable to that of the drilling mud such that the differences in conductivity between two muds cannot be ignored. In other words, the leakage impedance can be considered as constant but the contact impedance cannot and will increase with increasing resistivity and thickness of the mud.

With increasing value of contact impedance, there will be increasing leakage current. It is clear that the value of the contact impedance is not directly accessible, but nevertheless, the present inventors propose means for obtaining $I_P$.

If, as in one of the embodiments of the invention, each injector is protected by a screen made of a material that is a good conductor of electricity, and said screen is maintained at a potential that is identical to that of the injector, then it is possible in practice to ignore leaks from the injector (since all of the leaks take place from the screen), and as a result the current leaving the injector is identical to the current $I_P$ injected into the mud and into the formation, which current can indeed be measured by means of a device connected between the screen and the injector.

Figure 6:
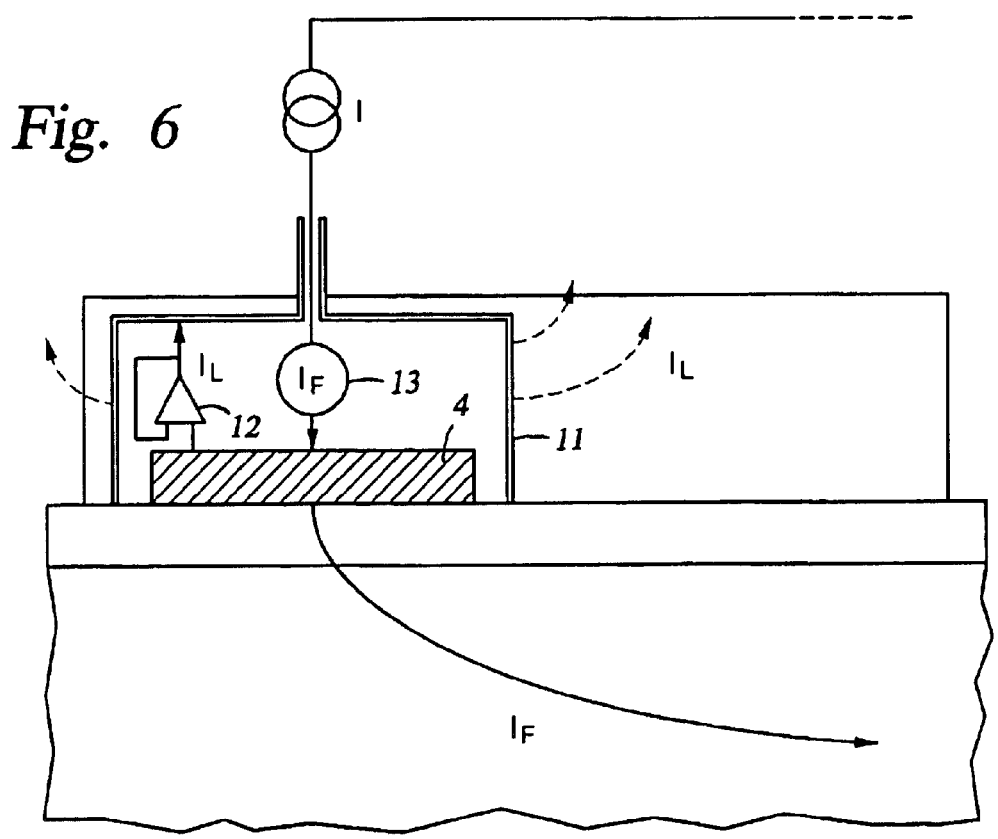
FIG. 6 shows an embodiment of the tool for compensating electricity leaks via the pad.
Figure 7:
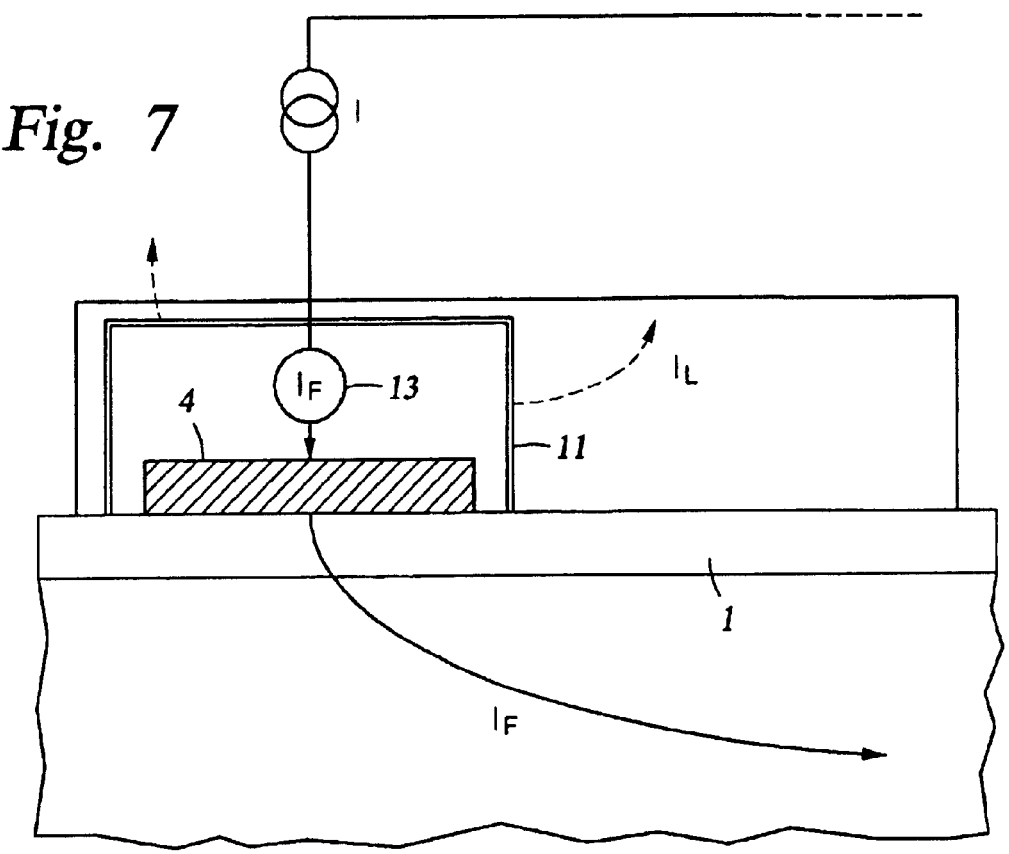
FIG. 7 shows a second embodiment of the tool.

FIGS. 6 and 7 show two embodiments envisaged for that purpose. In the first embodiment shown in FIG. 6, a follower amplifier 12 of high input impedance is used to maintain the potential of the screen 11 identical with the potential of the injector. A low impedance ammeter 13, e.g. a miniaturized transformer, is connected to the injector 4 (or 5) and to the screen 11, thereby making it possible to measure the value of $I_F$ directly.

This first embodiment is suitable when the injection voltage is relatively low. For high injection voltages, it is preferable to opt for the second embodiment shown in FIG. 7, in which there is merely a low impedance ammeter 13 connected between the screen 11 and the injector 4 (or 5). Because of the presence of a layer of mud 1 that presents high resistance beneath the injector, the impedance between the two injectors is very large compared with the impedance of the ammeter. Consequently, the voltage drop through the ammeter is small compared with the potential difference between the two injectors. As a result the screen is maintained at a potential that is practically identical to that of the injector which means that the leakage currents between the screen and the injector are negligible. Under such conditions, the ammeter does indeed measure the current injected into the formation. If contact between the injectors and the layer of mud is good, there is no need to put a screen into place, and regardless of the thickness of the layer of mud the ammeter does indeed measure the current leaving the front face of the injector to penetrate into the layer of mud and then into the formation.

Figure 8:
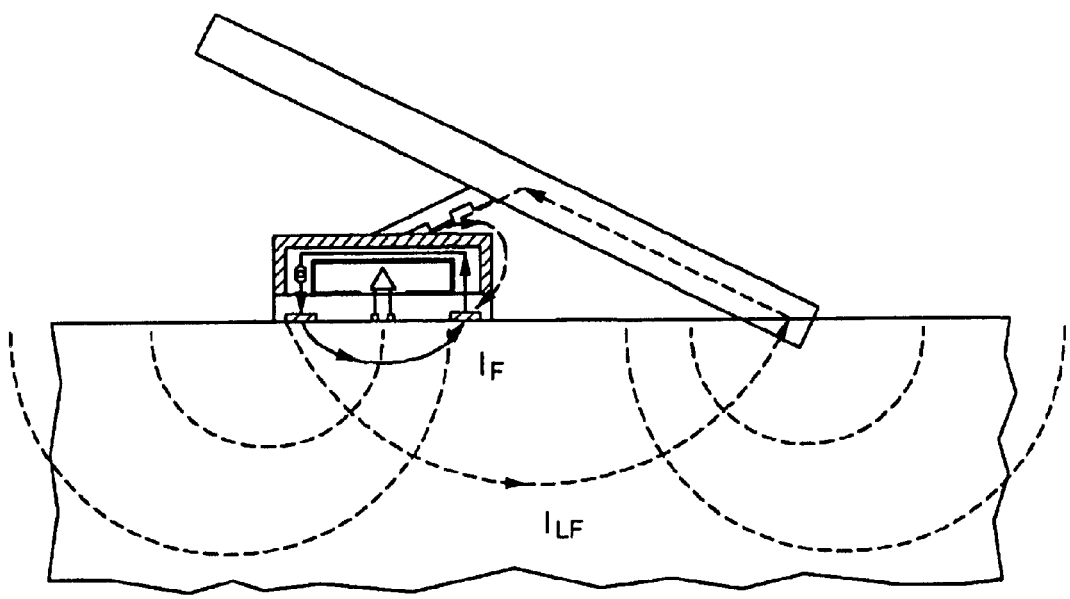
FIG. 8 is a diagram showing auxiliary sources of "electricity leaks".

The screen around the injectors thus provides simple means for compensating the effect of current leaks within the pad. It also makes it possible to identity and measure other sources of current loss. As shown in FIG. 8, a current loop $I_{LF}$ can arise via the formation with other portions of the tool in contact with the formation (perhaps accidentally) or via the electric cable used for suspending the tool and by capacitive coupling with the second injector. Under such circumstances, the current measured at the first injector is the sum of the currents $I_F$ plus $I_{LF}$, whereas the current measured at the second injector is equal to $I_F$.

It should be observed that the two approaches proposed in the present application can advantageously be combined: in which case, the calibration curves for calibrating the tool are established using a pad whose injectors are provided with isolating screens.

What is claimed is:

1. A method of investigating the wall of a borehole in a geological formation, the method comprising injecting a current I into the formation via two injectors between which a potential V is applied, and measuring the potential difference $\delta V$ between two electrically isolated measurement electrodes situated between the two injectors and insulated from the formation by an electrically insulating layer, wherein the resistivity Rt of the formation is obtained using the measured values of $\delta V$, V, and I, with corrections for effects due to the nature and the thickness of the electrically insulating layer.

2. An investigation method according to claim 1, characterized in that said correction is performed on the basis of a correction factor obtained from curves of $k=Rt.I/\delta V$ as a function of the impedance V/I of the injector.

3. An investigation method according to claim 2, characterized in that the value of k is estimated for formations of resistivity less than 1000 ohm.m by assuming that the value of 1/k is a function that depends only on the impedance of the injector $Z_I$V/I.

4. An investigation method according to claim 2, characterized in that the value of k is estimated for formations of resistivity greater than 1000 ohm.m by assuming that the value of 1/k is a function that depends only on the impedance of the injector $Z_1=V/I$ and on the resistivity of the insulating layer.

5. An investigation method according to claim 2, characterized in that the value of the geometrical factor k is determined by modelling or by experiment, by measuring the values of $\delta V$, V, and I while varying the resistivity of the formation, the distance between the injectors and the wall, and the resistivity of the insulating layer.

6. An investigation method according to claim 1, characterized in that the resistivity of the formation is measured by evaluating the current $I_F$ actually injected into the formation and/or leakage currents $I_L$, and by applying the following formula to calculate the resistivity Rt:

$$Rt = k_c \frac{\delta V}{I_F} = k_c \frac{\delta V}{I - I_L}$$

where $k_c$ is a geometrical constant.

7. An investigation method according to claim 6, characterized in that the current injectors are surrounded over all of their faces, with the exception of the face in contact with the insulating layer, by an electrically conductive screen, and the current actually injected into the formation is measured by means placed between an injector and its screen.

8. A device for a tool for investigating the wall of a borehole in a geological formation, the device comprising:
   a) a non-conductive pad having an inside face and an outside face for pressing against the wall;
   b) a set of measurement electrodes placed on the outside face of the pad and means for measuring potential difference between pairs of measurement electrodes; and
   c) a source electrode for injecting current into the geological formation and a return electrode, the set of measurement electrodes being situated between the source electrode and the current return electrode;
   the device being characterized in that each of the source electrode and the return electrode is surrounded by a respective electrically conductive screen.

9. A device according to claim 8, characterized by means for maintaining the electric potential of the screen identical to the potential of the electrode.

10. A device according to claim 9, characterized in that it includes a follower amplifier for adjusting said potential of the screen.

11. A device according to claim 8, characterized in that it includes an ammeter placed between the electrode and the screen to measure the current injected into the formation.

12. A device according to claim 9, characterized in that it includes an ammeter placed between the electrode and the screen to measure the current injected into the formation.

* * * * *